No. 687,647. Patented Nov. 26, 1901.
T. J. O'BRIEN & H. L. ALLEN
CLUTCH.
(Application filed Dec. 24, 1900.)

(No Model.)

WITNESSES:
H. T. Dieterich
J. B. Owens.

INVENTORS
Thomas J. O'Brien
Homer L. Allen
BY Munn
ATTORNEYS

UNITED STATES PATENT OFFICE.

THOMAS J. O'BRIEN AND HOMER L. ALLEN, OF CAIRO, ILLINOIS.

CLUTCH.

SPECIFICATION forming part of Letters Patent No. 687,647, dated November 26, 1901.

Application filed December 24, 1900. Serial No. 40,950. (No model.)

*To all whom it may concern:*

Be it known that we, THOMAS J. O'BRIEN and HOMER L. ALLEN, citizens of the United States, and residents of Cairo, in the county of Alexander and State of Illinois, have invented a new and Improved Clutch, of which the following is a full, clear, and exact description.

This invention relates to a clutch-pulley which may be rendered fast or loose on the shaft, as desired, and comprises two clutch members which in addition to engaging the pulley to render it fast on the shaft serve further as a bearing for the pulley on which the pulley is carried to turn when the clutch is thrown out of gear.

This specification is a specific description of one form of our invention, while the claim is a definition of the actual scope thereof.

Reference is to be had to the accompanying drawings, forming a part of this specification, in which similar characters of reference indicate corresponding parts in all the views.

Figure 1:
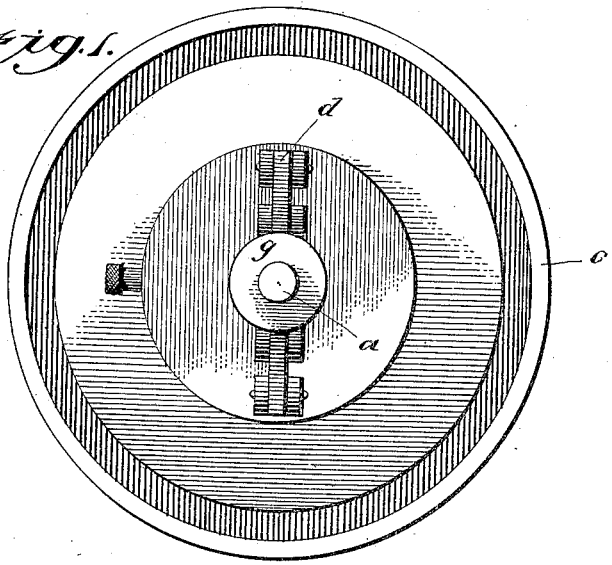
Figure 2:
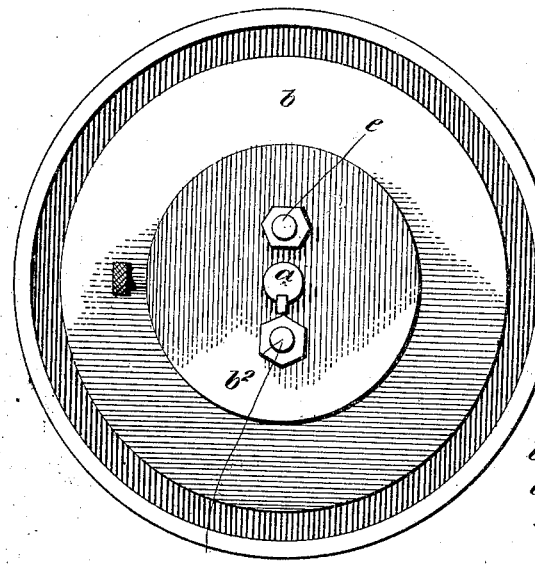
Figure 3:
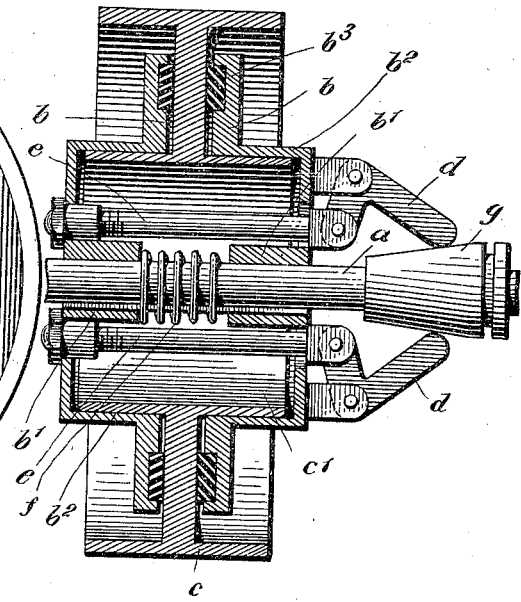

Figure 1 is an end elevation of the invention. Fig. 2 is an elevation of the opposite end thereof, and Fig. 3 is a longitudinal section of the same.

$a$ represents the shaft, and $b$ the clutch members, which have hubs $b'$ splined on the shaft. The clutch members $b$ are further provided with enlarged drum-like portions $b^2$, forming bearings for the hollow hub $c'$ of the pulley $c$. The pulley comprises the hub, the web, the rim, and the clutch members acting against the web, as shown. By this construction the pulley is properly mounted to turn concentrically to the shaft, and yet space is provided in the proper position for certain other elements necessary to the operation of the clutch, which will be described hereinafter. When the clutch members are frictionally engaged with the web, which engagement is assisted by a suitable elastic packing $b^3$, the pulley is rendered fast on the shaft, and when the clutch members are disengaged the pulley is free to turn, as the shaft, with its hub $c'$, lies within the drum-like bearing portions $b^2$ of the clutch members.

Fulcrumed on the bearing portions $b^2$ of one of the clutch members $b$ are two bell-crank levers $d$, which are connected with rods $e$, extending through the hub of the pulley and parallel with the shaft, these rods being connected at their opposite ends with the other clutch member. A spring $f$ bears between the hubs $b'$ of the clutch members to force the members apart, and a cone $g$ slides on the shaft and engages the bell-crank levers $d$, so that when the cone is moved inward, as shown in Fig. 3, strain is placed upon the rods $e$ and the two clutch members are drawn together and engaged with the web of the pulley. By these means the pulley is rendered fast on the shaft, and by moving the cone back the spring $f$ is permitted to assert itself and spread the clutch members.

Having thus described our invention, we claim as new and desire to secure by Letters Patent—

The combination of a shaft, clutch members mounted thereon to turn with the shaft and to have relative movement toward and from each other, said clutch members having drum-like portions projected toward each other, a pulley having a hollow hub located in the said drum-like portions of the clutch members and revolubly sustained thereby, the hollow hub leaving a space within the pulley around the shaft, and the clutch members working with the pulley to fasten it to the shaft, a connection extending between the clutch members through the hollow hub of the pulley, a lever attached to said connection and mounted on one of the clutch members, and means for throwing the lever to engage the clutch members with the pulley, for the purpose specified.

In testimony whereof we have signed our names to this specification in the presence of two subscribing witnesses.

THOMAS J. O'BRIEN.
HOMER L. ALLEN.

Witnesses:
 WM. M. BUTLER,
 HENRY G. WEIMAN.